(12) United States Patent
Germain

(10) Patent No.: US 7,862,052 B2
(45) Date of Patent: Jan. 4, 2011

(54) VEHICLE ROLL CONTROL SYSTEM

(75) Inventor: Philippe Germain, Fontenay-sous-Bois (FR)

(73) Assignee: BWI Company Limited S.A., Luxembourg (LU)

( * ) Notice: Subject to any disclaimer, the term of this patent is extended or adjusted under 35 U.S.C. 154(b) by 237 days.

(21) Appl. No.: 12/217,802

(22) Filed: Jul. 9, 2008

(65) Prior Publication Data

US 2009/0020966 A1  Jan. 22, 2009

(30) Foreign Application Priority Data

Jul. 19, 2007 (GB) ................................. 0714102.1

(51) Int. Cl.
*B60G 21/045* (2006.01)
(52) U.S. Cl. .......... 280/5.506; 280/5.508; 280/124.159; 280/124.16
(58) Field of Classification Search ............. 280/5.506, 280/5.508, 124.106, 124.158, 124.159, 124.16; 701/38
See application file for complete search history.

(56) References Cited

U.S. PATENT DOCUMENTS

| 6,520,510 | B1 * | 2/2003 | Germain et al. | 280/5.511 |
| 7,293,780 | B2 * | 11/2007 | Germain et al. | 280/5.506 |
| 7,475,895 | B2 * | 1/2009 | Stacey et al. | 280/124.16 |
| 7,694,984 | B2 * | 4/2010 | Germain | 280/124.161 |
| 2005/0082781 | A1 * | 4/2005 | Germain et al. | 280/124.106 |
| 2005/0280237 | A1 * | 12/2005 | Stacey et al. | 280/124.16 |
| 2008/0067770 | A1 * | 3/2008 | Germain | 280/124.106 |
| 2008/0067863 | A1 * | 3/2008 | Germain | 303/11 |
| 2008/0140284 | A1 * | 6/2008 | Germain et al. | 701/38 |
| 2009/0020964 | A1 * | 1/2009 | Germain | 280/5.506 |

FOREIGN PATENT DOCUMENTS

| EP | 0783986 | 7/1997 |
| EP | 1103395 | 5/2001 |
| WO | 02/083439 | 10/2002 |
| WO | 03/093041 | 11/2003 |
| WO | 2005/108128 | 11/2005 |

* cited by examiner

*Primary Examiner*—Paul N Dickson
*Assistant Examiner*—Drew Brown
(74) *Attorney, Agent, or Firm*—Dickinson Wright PLLC

(57) ABSTRACT

A roll control system comprising a front torsion bar; a front first hydraulic actuator attached to the front torsion bar; a rear torsion bar; a rear first hydraulic actuator attached to the rear torsion bar; and control means connected to the hydraulic actuators and controlling the operation thereof on detection of a predetermined vehicle condition; wherein each hydraulic actuator comprises a first fluid chamber and a second fluid chamber; wherein the control means comprises a source of fluid pressure, a fluid reservoir, a pressure control valve fluidly connected between the pressure source and the reservoir, two pressure relief valves each having two positions to selectively fluidly connect the fluid chambers of the hydraulic actuators either to the pressure source or to the fluid reservoir, and a directional valve fluidly connected between the pressure relief valves and the fluid chambers of the hydraulic actuators; wherein the pressure relief valves and the directional valve are positioned on detection of the predetermined vehicle condition to apply a fluid pressure to the first fluid chamber of the first front and rear hydraulic actuators, and/or to apply a fluid pressure to the second fluid chamber of the first front and rear hydraulic actuators.

7 Claims, 4 Drawing Sheets

US 7,862,052 B2

VEHICLE ROLL CONTROL SYSTEM

TECHNICAL FIELD

The present invention relates to a roll control system for a motor vehicle.

BACKGROUND OF THE INVENTION

EP-A-0783986 describes a roll control system in which hydraulic actuators are powered to provide active roll control for the vehicle. The actuators generate torsion in the vehicle's torsion bars. WO-A-02/83439 describes an active roll control system having two hydraulic actuators attached to each torsion bar. EP-A-1103395 discloses a vehicle roll control system in which a pair of directional valves and a pressure control valve are used to control the movement of the piston of hydraulic actuators associated with the front and rear axles of a motor vehicle. WO-A-03/093041 discloses a vehicle roll control system in which a pair of pressure control valves and a directional valve are used to control the movement of the piston of hydraulic actuators associated with the front and rear axles of a motor vehicle. In both cases, each hydraulic actuator has a first fluid chamber positioned on one side of the piston, and a second fluid chamber positioned on the other side of the piston. The first fluid chambers of the front and rear hydraulic actuators receive hydraulic fluid at substantially the same pressure; and the second fluid chambers of the front and rear hydraulic actuators receive hydraulic fluid at substantially the same pressure. WO-A-2005/108128 discloses a roll control system in which the control means for the hydraulic circuit is capable of providing fluid pressure to the first fluid chamber of the front hydraulic actuator which is different from the fluid pressure provided to the first fluid chamber of the rear hydraulic actuator; and/or is capable of providing fluid pressure to the second fluid chamber of the front hydraulic actuator which is different from the fluid pressure provided to second fluid chamber of the rear hydraulic actuator.

SUMMARY OF THE INVENTION

The aim of the present invention is to provide a roll control system which is an improvement to known arrangements.

A roll control system in accordance with the present invention is defined by the features of a front second hydraulic actuator associated with the front axle and a second rear hydraulic actuator associated with the rear axle. The control means for the hydraulic circuit is capable of providing fluid pressure to the first fluid chamber of the first front and rear hydraulic actuators and to the second fluid chamber of the second front and rear hydraulic actuators.

The present invention provides a system which allows an aggressive roll control strategy and balance strategy which leads to improvements in motion, turning, and stability (braking in turn at high speed). The present invention also provides continuous control between right turn and left turn, and is a single channel system which allows adaptive front/rear handling balance with load, speed and other factors, improving vehicle stability and control.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
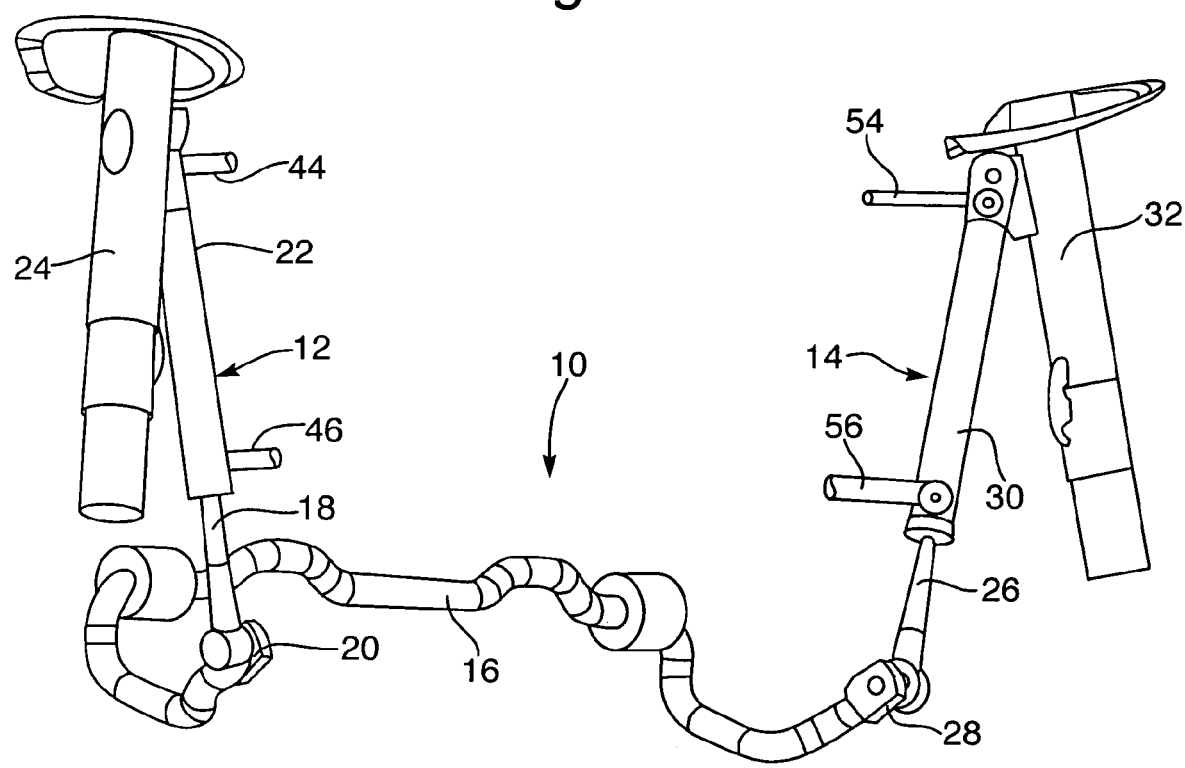
FIG. 1 is a view of the hydraulic actuators and torsion bar of a roll control system in accordance with the present invention for one axle of a motor vehicle.

FIG. 1 shows a portion of a roll control system 10 in accordance with the present invention for one axle of a motor vehicle. The roll control system 10 includes a first hydraulic actuator 12, a second hydraulic actuator 14, and a torsion bar 16. The first actuator 12 has a piston rod 18 which is fixed to one end 20 of the torsion bar 16; and a housing 22 which is connected to one of the shock absorbers 24 associated with the vehicle axle. The second actuator 14 has a piston rod 26 which is fixed to the other end 28 of the torsion bar 16; and a housing 30 which is connected to the other shock absorber 32 associated with the vehicle axle. The first and second actuators 12, 14 are substantially identical, and further details are given below.

Figure 2:
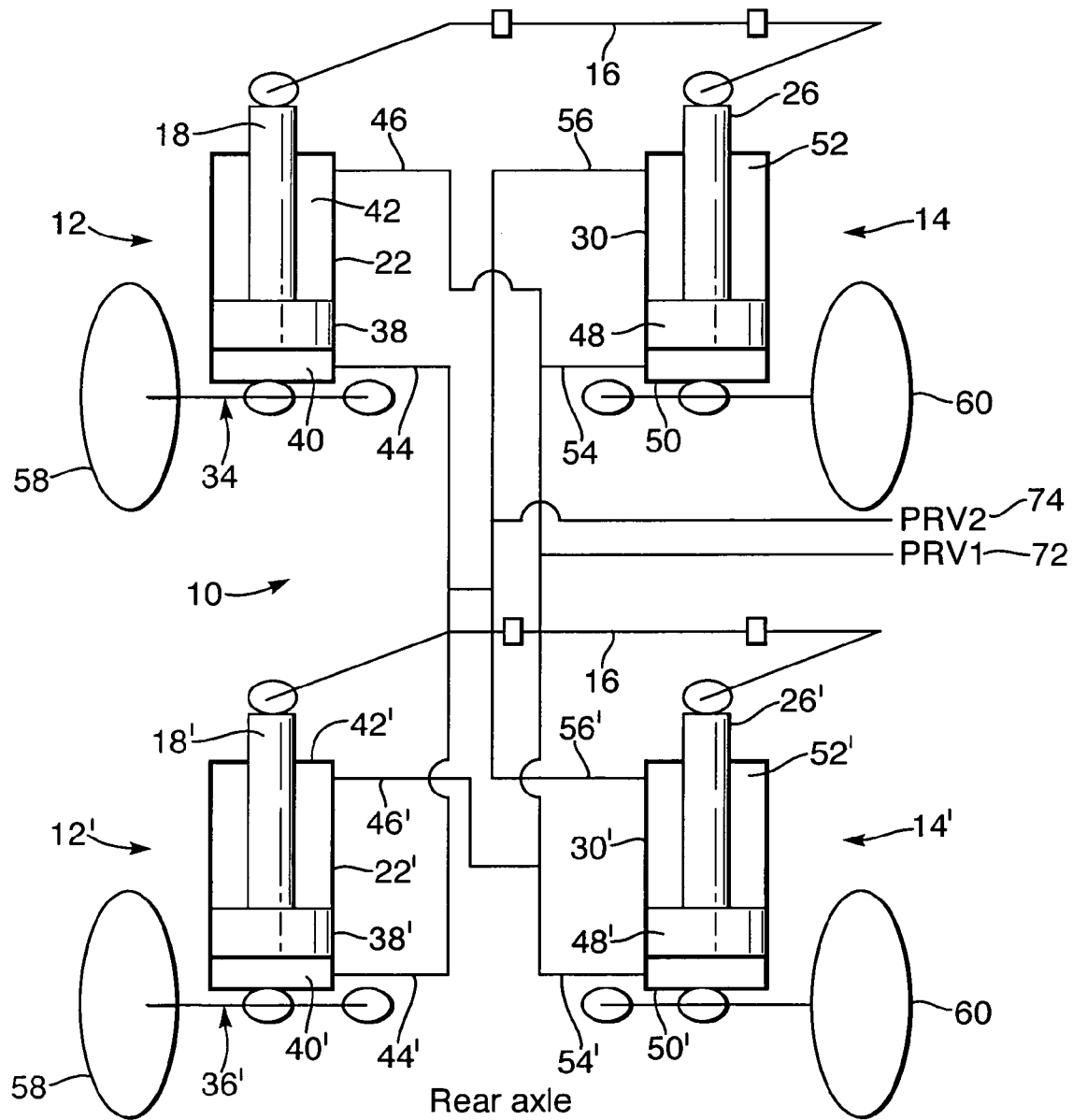
FIG. 2 is a schematic view of a roll control system in accordance with the present invention, with the hydraulic system and electrical control system omitted for clarity.

In FIG. 2, further details of the roll control system 10 of FIG. 1 are shown in connection with the front axle 34 and the rear axle 36 of the vehicle. The first and second actuators 12, 14 and the torsion bar 16 for the front axle 34 are substantially identical, and substantially identical to the first and second actuators 12', 14' for the rear axle 36. Each first actuator 12, 12' comprises the housing 22, 22'; a piston 38, 38' sealably slidably mounted inside the housing; a compression chamber 40, 40' and a rebound chamber 42, 42' defined by the piston inside the housing; the piston rod 18, 18' connected to the piston, extending through the rebound chamber, and out of the housing; a fluid line 44, 44' connected to the compression chamber; and a fluid line 46, 46' connected to the rebound chamber. Each second actuator 14, 14' comprises the housing 30, 30'; a piston 48, 48' sealably slidably mounted inside the housing; a compression chamber 50, 50' and a rebound chamber 52, 52' defined by the piston inside the housing; the piston rod 26, 26' connected to the piston, extending through the rebound chamber, and out of the housing; a fluid line 54, 54' connected to the compression chamber; and a fluid line 56, 56' connected to the rebound chamber.

Figure 3:
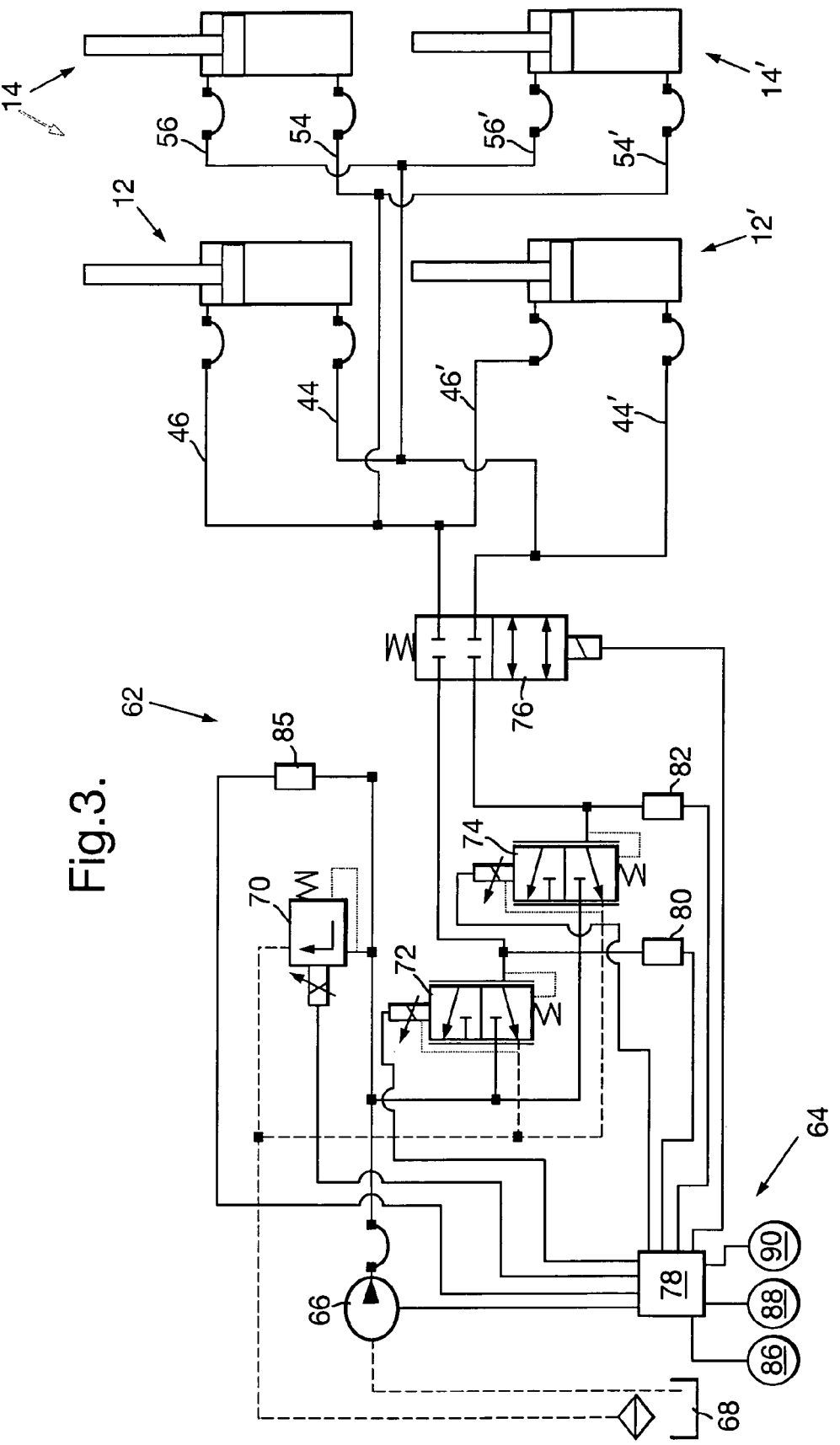
FIG. 3 is a schematic view of a roll control system in accordance with the present invention showing a first embodiment of the hydraulic system.

FIG. 3 shows a first embodiment of the hydraulic system 62 and electrical control system 64 for the roll control system 10 of FIGS. 1 and 2. The hydraulic system includes a fluid pump 66, a tank or reservoir 68, a pressure control valve 70, a first pressure relief valve 72, a second pressure relief valve 74, and a directional valve 76. The electrical control system 64 includes a control module 78 which is electrically connected to the pump 66, the pressure control valve 70, the pressure relief valves 72, 74, and the directional valve 76, to control the operation thereof. The module 78 is also connected to pressure sensors 80, 82 associated with each pressure relief valve 72, 74 and with a pressure sensor 85 which monitors the applied fluid pressure from the fluid pump 66 as control by the pressure control valve 70. The module 78 is also connected to other vehicle sensors such as a lateral g sensor 86 (which monitors the sideways acceleration of the vehicle), a steering sensor 88 (which monitors the steering angle of the front wheels), a vehicle speed sensor 90, and/or any other relevant parameter. From the signals from the various sensors, the control module 78 determines if roll control is required and actuates the pressure control valve 70, the pressure relief valves 72, 74, and the directional is 76 as appropriate.

In this first embodiment, each pressure relief valve 72, 74 and the directional valve 76 are solenoid actuated and each has two positions. When the pressure relief valves 72, 74 and the directional valve 76 are in their first or rest position, as shown in FIG. 3, the compression chamber 40, 40', 50, 50' of each actuator 12, 12', 14, 14' are fluidly isolated from the rebound chamber 42, 42', 52, 52' of the same actuator. When the first pressure relief valve 72 and the directional valve 76 are actuated to their second position, the rebound chambers 42, 42' of the first actuators 12, 12' and the compression chambers 50, 50' of the second actuators 14, 14' are fluidly connected to the pump 66 in order to receive pressurised fluid. When the second pressure relief valve 74 and the directional valve 76 are actuated to their second position, the compression chambers 40, 40' of the first actuators 12, 12' and the rebound chambers 52, 52' of the second actuators 14, 14' are fluidly connected to the pump 66 in order to receive pressurised fluid. If the second pressure relief valve 74 remains at its first or rest position when the first pressure relief valve 72 and the directional valve 76 are actuated to their second position, the compression chambers 40, 40' of the first actuators 12, 12' and the rebound chambers 52, 52' of the second actuators 14, 14' are fluidly connected to the tank 68. If the first pressure relief valve 72 remains at its first or rest position when the second pressure relief valve 74 and the directional valve 76 are actuated to their second position, the rebound chambers 42, 42' of the first actuators 12, 12' and the compression chambers 50, 50' of the second actuators 14, 14' are fluidly connected to the tank 68. The pressure of the fluid, as generated by the pump 66, is controlled by the pressure control valve 70. Actuation of the directional valve 76 and one or both pressure relief valves 72, 74 creates a pressure differential between the compression chamber 40, 40', 50, 50' and the rebound chamber 42, 42', 52, 52' of one or more of the actuators 12, 12', 14, 14' to cause the actuator or actuators to extend or compress (dependent on which pressure relief valves are actuated and the controlled pressure from the pump 66), thereby having an effect on the roll or pitch of the vehicle. The pressure relief valves 72, 74 may be actuated in isolation from one another, or may be actuated substantially simultaneously.

Figure 4:
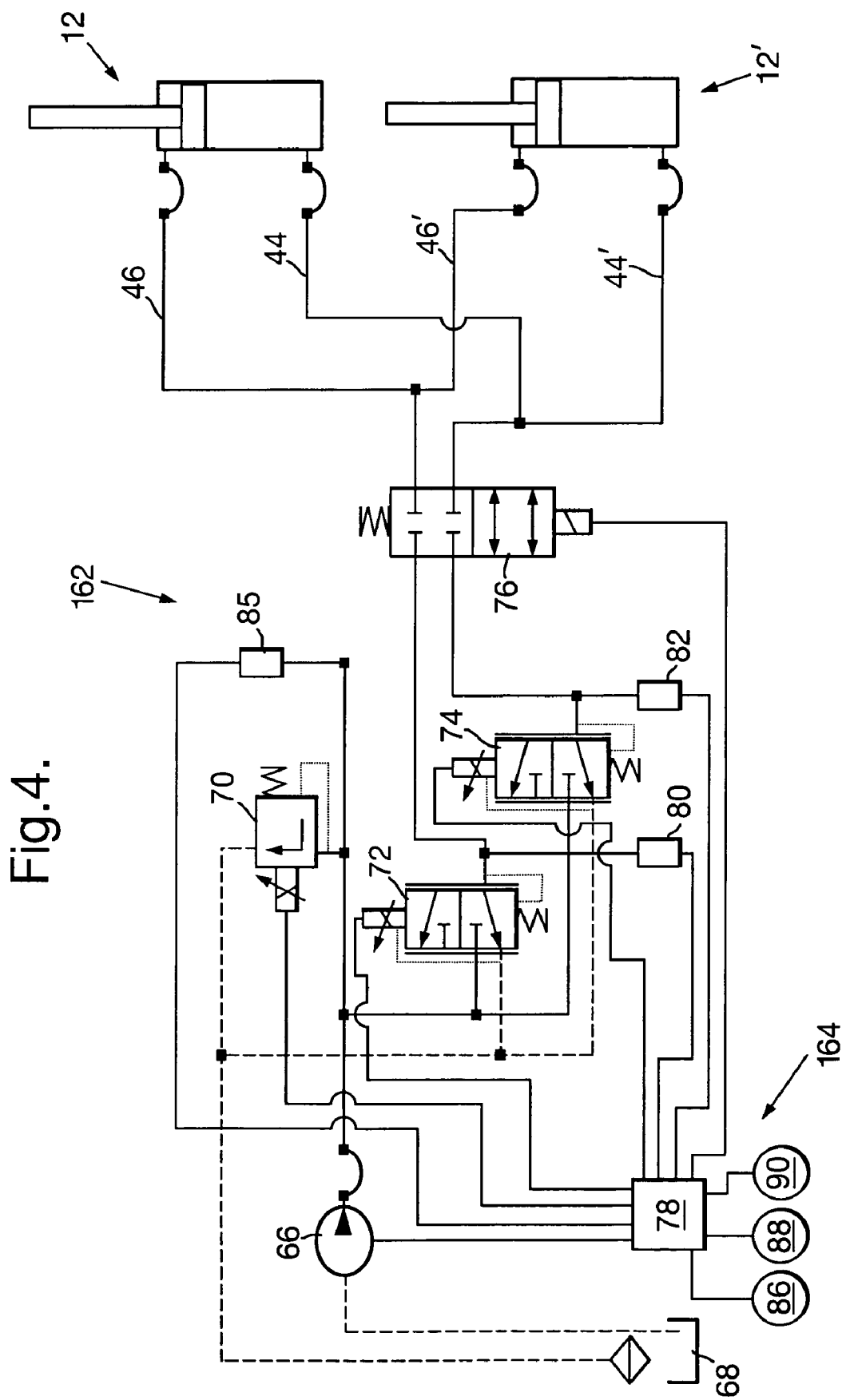
FIG. 4 is a schematic view of a roll control system in accordance with the present invention showing a second embodiment of the hydraulic system.

FIG. 4 shows a second embodiment of the hydraulic system 162 and electrical control system 164 of the roll control system in accordance with the present invention. The hydraulic system 162 is substantially identical to the hydraulic system 62 of the first embodiment, and like parts have been given the same reference numeral. The electrical control system 164 is substantially identical to the electrical system 64 of the first embodiment, and like parts have been given the same reference numeral.

In this second embodiment, the second actuator 14, 14' has been omitted and is replaced by a substantially rigid arm (not shown) such that a single hydraulic actuator is associated with each of the front and rear axles 34, 36. As a consequence, when the first pressure relief valve 72 and the directional valve 76 are actuated to their second position, the rebound chambers 42, 42' of the first actuators 12, 12' are fluidly connected to the pump 66 in order to receive pressurised fluid. Also, when the second pressure relief valve 74 and the directional valve 76 are actuated to their second position, the compression chambers 44, 44' of the first actuators 12, 12' are fluidly connected to the pump 66 in order to receive pressurised fluid. Other aspects of the second embodiment, and the operation of the roll control system, are substantially identical to that above with respect to the first embodiment.

In both embodiments, the pressure relief valves 72, 74 and the directional valve 76 are preferably solenoid actuated as shown in FIGS. 3 and 4. Alternatively, the pressure relief valves and the directional valve may be hydraulically actuated by first and second pilot (on/off) valves (not shown). In both embodiments, the directional valve 76 and the pressure relief valves 72, 74 have a first (rest) position in which the fluid chambers are fluidly isolated and a second (actuated) position in which the fluid chambers can receive pressurised fluid. It will be appreciated that the directional valve 76 and the pressure relief valves 72, 74 may have the reverse operation of the first position being the actuated position and the second position being the rest position.

The pump 66 may be driven by the vehicle engine and hence continuously actuated. Alternatively, the pump 66 is driven by an electric motor or any other suitable means, either continuously, or variably. The pressure control valve 70 is actuated to adjust the fluid pressure in the hydraulic system between a predetermined minimum pressure and a predetermined maximum pressure. The pressure control valve 70 is also actuated to adjust the pressure differentials between the compression and rebound chambers of the hydraulic actuators (when the pressure relief valves and directional valve are also actuated as required).

In either of the above embodiments, the hydraulic actuator may include a check valve (not shown, but preferably mounted in the piston) which allows flow of hydraulic fluid from the first fluid chamber to the second fluid chamber only when the fluid pressure in the first fluid chamber is greater than the fluid pressure in the second fluid chamber. With such an arrangement, the second fluid chamber can be connected to a reservoir during servicing of the actuator to bleed air from the hydraulic fluid. Also, the presence of the check valve reduces the risk of air being sucked into the second fluid chamber should the fluid pressure in the second fluid chamber fall below the fluid pressure in the first fluid chamber, and provides further improvements in ride comfort.

The above embodiments describe a roll control system for front and rear axles of a motor vehicle. The orientation of each hydraulic actuator may be reversed with the housing connected to one end of the torsion bar, and the piston rod attachable to the axle. Although drop-link hydraulic actuators are shown, it will be appreciated that other designs of hydraulic actuator may be used.

Having thus described the invention, it is claimed:

1. A roll control system for a vehicle having a pair of front wheels each rotatable on a front axle and a pair of rear wheels each rotatable on a rear axle, the system comprising a front torsion bar; a front first hydraulic actuator attached to one end of the front torsion bar and a front second hydraulic actuator attached to the other end of the front torsion bar and each of said front actuators connectable to the front axle; a rear torsion bar; a rear first hydraulic actuator attached to one end of the rear torsion bar and a rear second hydraulic actuator attached to the other end of the rear torsion bar and each of said rear actuators connectable to the rear axle; and a controller connected to the hydraulic actuators and controlling the operation thereof on detection of a predetermined vehicle condition; wherein each hydraulic actuator comprises a housing, a piston making a sealing sliding fit inside the housing to define a first fluid chamber and a second fluid chamber, and a piston rod connected to the piston and extending through the second fluid chamber and out of the housing; wherein the controller comprises a source of fluid pressure, a fluid reservoir, a pressure control valve fluidly connected between the pressure source and the reservoir, two pressure relief valves each having two positions to selectively fluidly connect the fluid chambers of the hydraulic actuators either to the pressure source or to the fluid reservoir, and a directional valve fluidly connected between the pressure relief valves and the fluid chambers of the hydraulic actuators; wherein the pressure relief valves and the directional valve are positioned on detection of the predetermined vehicle condition to apply a fluid pressure to the first fluid chamber of the first front and rear hydraulic actuators and to the second fluid chamber of the second front and rear hydraulic actuators.

2. The roll control system of claim 1, wherein the pressure relief valves and the directional valve are positioned on detection of the predetermined vehicle condition to apply a fluid pressure to the second fluid chamber of the first front and rear hydraulic actuators.

3. The roll control system of claim 1, wherein the directional valve has a rest position in which the fluid chambers of the hydraulic actuators are fluidly isolated from the pressure relief valves, and an actuated position in which the fluid chambers of the hydraulic actuators are fluidly connected with the pressure relief valves.

4. The roll control system of claim 3, wherein each pressure relief valve has a rest position to fluidly connect the fluid chambers of the hydraulic actuators to the fluid reservoir, and an actuated position to fluidly connect the fluid chambers of the hydraulic actuators to the pressure source, when the directional valve is in its actuated position.

5. The roll control system of claims 1, wherein the pressure relief valves and the directional valve are solenoid actuated.

6. The roll control system of claim 1, wherein the controller comprises an electrical control module electrically connected to, and controlling the operation of, the source of fluid pressure, the pressure control valve, the pressure relief valves and the directional valve.

7. The roll control system of claim 6, further comprising a pressure sensor associated with each pressure relief valve, and a pressure sensor associated with the pressure control valve, the pressure sensors being connected to the electrical control module.

\* \* \* \* \*

UNITED STATES PATENT AND TRADEMARK OFFICE
CERTIFICATE OF CORRECTION

| | | |
|---|---|---|
| PATENT NO. | : 7,862,052 B2 | |
| APPLICATION NO. | : 12/217802 | |
| DATED | : January 4, 2011 | |
| INVENTOR(S) | : Philippe Germain | |

It is certified that error appears in the above-identified patent and that said Letters Patent is hereby corrected as shown below:

Column 3, Line 2: "the directional is 76" should read --the directional 76--.

Signed and Sealed this
Nineteenth Day of April, 2011

David J. Kappos
*Director of the United States Patent and Trademark Office*